Patented May 20, 1952

2,597,190

UNITED STATES PATENT OFFICE 2,597,190

PROCESS FOR THE PRODUCTION OF 17-HYDROXYPREGNANES

Lewis Hastings Sarett, Princeton, N. J., assignor to Merck & Co., Inc., Rahway, N. J., a corporation of New Jersey No Drawing. Application July 15, 1950, Serial No. 174,120

11 Claims. (Cl. 260—397.4)

This application is a continuation-in-part of my copending application, Serial No. 773,525, filed September 11, 1947, now Patent No. 2,541,104.

This invention relates to the preparation of steroid compounds which have a hydroxyl group in the 17-position. More particularly, it is directed to a new and improved process for the introduction of a hydroxyl group at the 17-carbon atom of a steroid compound which contains a double bond between the 17- and 20-carbon atoms.

The new and improved process which forms the subject matter of this invention is particularly advantageous for use in the introduction of a hydroxyl group in the 17-position of $\Delta^{17}$-pregnenes which contain a cyano group attached to the 20-carbon atom.

In the manufacture of cortisone (17-hydroxy-11-dehydrocorticosterone) and other adrenal hormones from starting material such as cholic acid and desoxycholic acid, at one stage of the process, there is secured a $\Delta^{17}$-pregnene compound having a cyano group in the 20-position. Since it is necessary to convert this steroid containing a double bond between carbon atoms 17 and 20 to a compound in which the double bond is eliminated and a hydroxyl group is attached to the 17-carbon atom, it has been usual to employ for this purpose the relatively rare and expensive compound osmium tetroxide. The osmylation of the cyano pregnene, and subsequent reduction of the intermediate osmium compound to introduce the hydroxyl group at the 17-position, is described in the literature, see for example the article by L. H. Sarett, J. A. C. S., 70, 1454 (1948). The process also forms the subject matter of my copending application to which reference has been previously made.

While the osmylation method utilizing osmium tetroxide is very satisfactory, and has been used in the treatment of $\Delta^{17}$-steroids, more especially in the manufacture of cortisone, it is also open to a number of objections. Among these is the relatively high cost of the reagent. Also, after the addition of osmium tetroxide to the double bond of the steroid compound, it is necessary to reduce the intermediate osmium addition product, and this additional step is not particularly desirable as an industrial procedure. Osmium tetroxide possesses the additional disadvantage of being volatile, thus being easily lost by volatilization during the process. It is also very irritating to the mucous membranes of the eyes, and is poisonous.

It has now been found that it is possible to introduce a hydroxyl group in the 17-position in $\Delta^{17}$-steroid compounds, more particularly in $\Delta^{17}$-pregnenes which have a cyano group attached to the 20-carbon atom, by treatment of the steroid with a permanganate, more particularly with a water-soluble permanganate such as a water-soluble alkali metal or alkaline earth metal permanganate. Potassium permanganate is the preferred treatment agent since it is commercially available in relatively large amounts.

The process is best carried out by bringing the permanganate and the steroid together under substantially neutral conditions or under weakly alkaline conditions, and hereinafter these conditions are described by the use of the generic term non-acid conditions. By this procedure the desired hydroxyl group is introduced at the 17-position, and in the proper steric configuration necessary for adrenal hormone compounds such as cortisone. This is the α or "natural" configuration.

Preferably, the improved process is carried out in a solution of a non-oxidizable organic solvent, the reaction mixture being cooled during the reaction in order to control the heat developed. While many non-oxidizable organic solvents can be utilized as the reaction media, such as dioxan and methyl ethyl ketone, we have obtained most satisfactory results with acetone. Acetone is preferred because of its availability and ease of purification.

The reaction proceeds rapidly and smoothly to yield the desired 17-hydroxy steroid, which may then be separated in crystalline form and recrystallized, thereby securing the product in substantially pure form. If desired, the solution may be subjected to a decolorizing step before separation of the desired product in crystalline form, and this may be carried out by treating the solution with a decolorizing agent such as potassium bisulfite in a dilute mineral acid, for example dilute hydrochloric acid solution.

We have secured most satisfactory results when the alkali metal permanganate and the steroid compound having a double bond between the 17- and 20-carbon atoms are brought together under non-acid conditions. Preferably, an aqueous alkaline or neutral solution of potassium permanganate in a non-oxidizable organic solvent solution, such as acetone, is utilized to introduce a 17-hydroxyl group into such steroid compounds as 3,11-diketo-21-acetoxy-20-cyano-$\Delta^{17}$-pregnene and 3,21-diacetoxy-11-keto-20-cyano-$\Delta^{17}$-pregnene.

The reactions occurring may be represented as follows, using the typical pregnenes referred to as illustrative. It should be understood, of course, that other pregnenes having a double bond in the 17—20 position can be similarly treated, and these two 20-cyanopregnenes are given merely as examples.

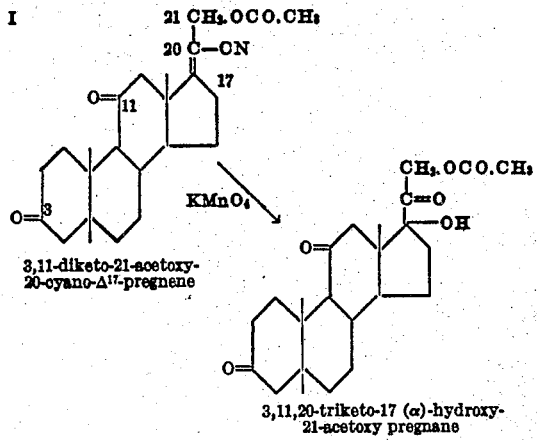

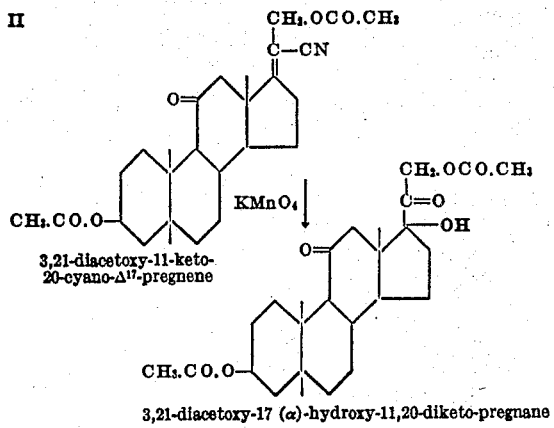

The following examples are illustrative of my improved process as applied to treatment of steroid compounds having a double bond between the 17- and 20-carbon atoms.

*Example 1*

A solution of 0.80 gram potassium permanganate in 8 milliliters of water and 30 milliliters of acetone was added dropwise to a solution of 2 grams of 3,11-diketo-21-acetoxy-20-cyano-$\Delta^{17}$-pregnene in about 80 milliliters of acetone. During the addition the reaction mixture was cooled and subjected to mechanical stirring.

Approximately one hour after the beginning of the dropwise addition, the brownish reaction mixture was treated with potassium bisulfite in dilute hydrochloric acid in order to decolorize it. It was then filtered and concentrated by heating the filtrate under reduced pressure less than atmospheric. Crude 3,11,20-triketo-17($\alpha$)-hydroxy-21-acetoxy-pregnane separated in crystalline form as small plates. As an alternative procedure, the filtrate can be concentrated by passing air through it in order to remove most of the acetone, followed by crystallization out of the crude 3,11,20-triketo-17($\alpha$)-hydroxy-21-acetoxy-pregnane.

The crude product was filtered off, washed with water, and dried on a water bath. Recrystallization from acetone-petroleum ether gave the pure crystalline product, which had a melting point of 230–231° C. A mixed melting point determination, when the product was mixed with pure 3,11,20-triketo-17($\alpha$)-hydroxy-21-acetoxy-pregnane obtained by a different method, showed no depression of the melting point.

The analysis of the product was as follows:

Theoretical for $C_{23}H_{32}O_6$_____ C, 68.29; H, 7.98
Found: _____ C, 68.33; H, 7.90
Product:

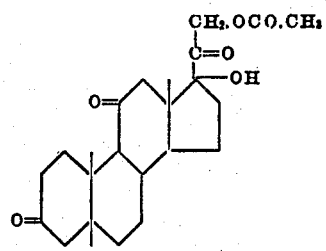

*Example 2*

One gram of 3,21-diacetoxy-11-keto-20-cyano-$\Delta^{17}$-pregnene was dissolved in 30 milliliters of acetone. The solution was cooled and there was then added to it, by dropwise addition, a solution containing 0.4 gram of potassium permanganate in 3 milliliters of water and 20 milliliters of acetone.

After addition of the permanganate had been completed, the mixture was decolorized by treatment with potassium bisulfite in dilute hydrochloric acid, and then filtered. The filtrate was concentrated by heating under reduced pressure, less than atmospheric, and the residue then diluted with water. A crystalline product separated which, when recrystallized from alcohol, yielded pure 3,21-diacetoxy-17($\alpha$)-hydroxy-11,20-diketo-pregnane melting at 234–237° C. A mixed melting point determination showed this product to be identical with the same compound as obtained by another method, that of Sarett, as described in the J. A. C. S., 70, 1454 (1948).

The analysis of the product was as follows:

Theoretical for $C_{25}H_{36}O_7$ ____ C, 66.94; H, 8.08
Found: _____ C, 66.82; H, 8.09
Product:

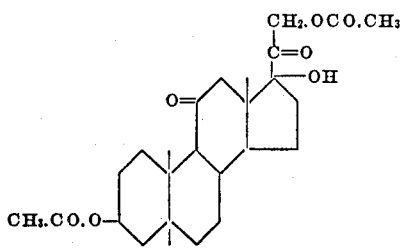

Various changes and modifications may be made in carrying out the present invention without departing from the spirit and scope thereof. Insofar as these changes and modifications are within the purview of the annexed claims, they are to be considered as part of my invention.

I claim:

1. The process for introducing a hydroxyl group at the 17-position in a steriod compound containing a 20-cyano group and a double bond between the 17- and 20-carbon atoms which comprises treating said compound with a permanganate in a non-acid reaction medium.

2. The process for introducing a hydroxyl group at the 17-position in a steriod compound containing a 20-cyano group and a double bond between the 17- and 20-carbon atoms which comprises treating said compound with a metal permanganate selected from the group which consists of alkali metal permanganates and alkaline earth metal permanganates, said reaction being carried out in a non-acid reaction medium.

3. The process for attaching a hydroxyl group to the 17-carbon atom of a pregnene containing a 20-cyano group and a double bond between the 17- and 20-carbon atoms which comprises reacting said compound with an alkali metal permanganate in a non-acid reaction medium.

4. The process for introducing a hydroxyl group in the 17-position and in the "α" or "natural" configuration of a $\Delta^{17}$-pregnene which contains a cyano group attached to the 20-carbon atom which comprises treating said pregnene with an alkali metal permanganate in a non-oxidizable organic solvent, said treatment being carried out under substantially neutral or alkaline conditions.

5. The process for introducing a hydroxyl group in the 17-position and in the "α" or "natural" configuration of a $\Delta^{17}$-pregnene which contains a cyano group attached to the 20-carbon atom which comprises treating said pregnene with potassium permanganate in an aqueous acetone solution, said treatment being carried out under substantially neutral or alkaline conditions.

6. The process for introducing a hydroxyl group in the "α" or "natural" configuration at the 17-carbon atom of a pregnene selected from the group which consists of 3,11-diketo-21-acetoxy-20-cyano-$\Delta^{17}$-pregnene, and 3,21-diacetoxy-11-keto-20-cyano-$\Delta^{17}$-pregnene, which comprises treating said compound with an alkali metal permanganate under non-acid reaction conditions.

7. The process for introducing a hydroxyl group in the "α" or "natural" configuration at the 17-carbon atom of a pregnene selected from the group which consists of 3,11-diketo-21-acetoxy-20-cyano-$\Delta^{17}$-pregnene and 3,21-diacetoxy-11-keto-20-cyano-$\Delta^{17}$-pregnene, which comprises treating said pregnene compound with potassium permanganate under non-acid reaction conditions.

8. The process for introducing a hydroxyl group in the "α" or "natural" configuration at the 17-carbon atom of a pregnene selected from the group which consists of 3,11-diketo-21-acetoxy-20-cyano-$\Delta^{17}$-pregnene and 3,21-diacetoxy-11-keto-20-cyano-$\Delta^{17}$-pregnene which comprises treating said pregnene compound with an alkali metal permanganate under non-acid reaction conditions in an aqueous non-oxidizable organic solvent.

9. The process claimed in claim 8, wherein said non-oxidizable organic solvent is acetone.

10. The process for introducing a hydroxyl group in the "α" or "natural" configuration at the 17-carbon atom of 3,11-diketo-21-acetoxy-20-cyano-$\Delta^{17}$-pregnene which comprises treating said pregnene compound with an alkali metal permanganate under non-acid reaction conditions in an aqueous non-oxidizable organic solvent.

11. The process for introducing a hydroxyl group in the "α" or "natural" configuration at the 17-carbon atom of 3,21-diacetoxy-11-keto-20-cyano-$\Delta^{17}$-pregnene which comprises treating said pregnene compound with an alkali metal permanganate under non-acid reaction conditions in an aqueous non-oxidizable organic solvent.

LEWIS HASTINGS SARETT.

REFERENCES CITED

The following references are of record in the file of this patent:

UNITED STATES PATENTS

| Number | Name | Date |
|---|---|---|
| 2,359,773 | Marker | Oct. 10, 1944 |